United States Patent Office 2,982,375
Patented May 2, 1961

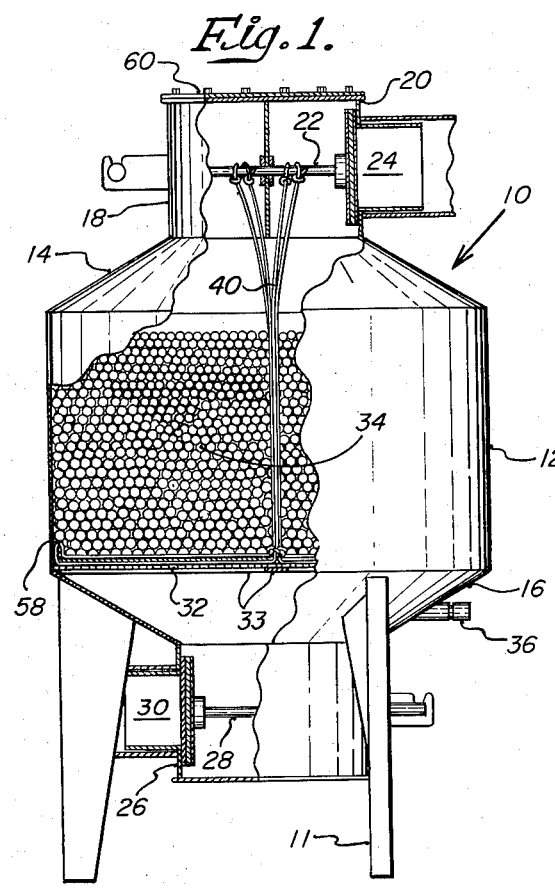

2,982,375
PROTECTION OF FRANGIBLE AGGREGATE WITHIN A PERFORATE APPARATUS

Irving Victor, Minneapolis, Minn., assignor to Vic Manufacturing Company Profit Sharing Trust, a trust of Minnesota Filed Jan. 27, 1958, Ser. No. 711,317

4 Claims. (Cl. 183—4)

This invention relates to a method and means of protecting an aggregate within a perforate apparatus during shipment or movement of the apparatus. In general, the invention is concerned with the provision of a temporary barrier or membrane that is disposed on a foraminous or perforate layer within an apparatus containing a frangible mass so as to protect the mass from attrition with the foraminous layer and also to protect against sifting of finely divided portions of the aggregate through the perforate surface during shipment or movement of the apparatus to its eventual site of use. More particularly, the invention is concerned with a temporary membrane disposed between a bed of carbon granules and a foraminous layer, within a solvent recovery apparatus during shipment and installation of said apparatus.

In my prior application, Ser. No. 644,155, filed March 5, 1957, I have disclosed apparatus for the recovery of chlorinated hydrocarbons from a mixture of air. This apparatus is used in conjunction with the solvent cleansing of materials, such as garments and other materials cleansed by solvent, such as the degreasing of metal parts. As disclosed in said application, a mass of activated carbon in granular or pelleted form is used as the solvent adsorber. The adsorbing material is enclosed within a metal casing and supported on a foraminous metal layer so that the solvent ladened vapors from which the solvent is adsorbed may freely pass through the carbon, and steam or other gases used to liberate the solvent from the adsorbing mass may also pass through the mass of carbon.

A particular commercial use of such recovery apparatus is in dry cleaning shops where it is used to recover relatively costly chlorinated solvents used for the cleansing of garments. As this solvent recovery apparatus is a new adjunct to the equipment now used in existing establishments, it must be added to existing apparatus without substantially disturbing operations in the dry cleaning shop. Since dry cleaning establishments will have at substantially all times a large number of customers' garments therein, many of which will be in a finished condition awaiting return to the customers, and for other reasons, such as the cleanliness of the establishment, the installation of the solvent recovery system creates a unique problem. On the one hand, it is impractical to load the carbon granules into the apparatus after installation, because the dust arising from dumping the frangible granules into the apparatus would be dispersed into the atmosphere and settle on the clean garments, as well as other surfaces in the shop and thereby cause substantial damage. On the other hand, if the carbon granules are placed in the apparatus before the transportation thereof from the factory to the point of eventual use, the jostling of the apparatus in transit will cause sifting of the fine particles of the carbon aggregate, and it might cause attrition between the granules and the foraminous surface and cause grinding and break-up of some of the lower layers of the larger granules to a size where they could pass through the foraminous surface, thereby resulting in a loss of the sifted portion and the consequent transfer of such portion to inaccessible or undesired parts of the apparatus.

In the present invention, I have provided means of protecting the granules in the form of a temporary barrier or membrane that is disposed on the foraminous surface within the apparatus prior to the loading of the carbon granules therein. The barrier or membrane acts to prevent sifting of fine particles and attrition between the granules and the foraminous surface during the movement and installation of the apparatus. The barrier must be of a character that will enable it to be readily removed from the foraminous layer without removal of the carbon granules from the apparatus, and without injury to the granules, and without disseminating dust that would be undesirable to persons within the establishment and might cause damage or injury to clean garments or other damageable surfaces.

An object of the invention is to provide a temporary barrier of a dust impervious nature to be installed within a perforate container adapted to receive a mass of aggregate to protect the aggregate against sifting and attrition during movement of the apparatus, which barrier is of a character that permits easy removal without injury to the container or the aggregate, and may be removed without disseminating dust from the mass of aggregate.

Another object is to provide a temporary membrane that may be installed in a substantially enclosed container between a mass of finely divided aggregate and a foraminous barrier, together with means for removing the membrane without substantially disturbing the aggregate.

A further object is to provide a method of installing and removing a temporary barrier within the bottom of a substantially closed container beneath a mass of finely divided aggregate therein so as to be easily removed through the aggregate without substantial disturbance thereof.

A further object is to provide a temporary barrier for the bottom surface of a circular container embodying segmental sections that may be arranged in a radial manner about the bottom of the container, together with a flexible member joined to each of the segmental portions in such a manner as to assure the complete removal of each segment when desired.

Other and further objects may become apparent from the following specification and claims, and in the appended drawing in which:

Fig. 1 is a vertical section of an apparatus embodying the present invention;

Fig. 2 is a plan view of a foraminous plate disposed in the lower portion of the container disclosed in Fig. 1;

Fig. 3 is a segmental portion of a barrier disposed on the plate disclosed in Fig. 2;

Fig. 4 is a sectional view taken on the line 4—4 of Fig. 3; and,

Fig. 5 is a perspective view of the assembled barrier disclosed in Fig. 1.

Having reference to the drawings, the invention will now be explained in detail.

Referring first to Fig. 1, reference character 10 designates a casing which may, if desired, be of cylindrical configuration consisting of a main body 12 formed with cone shaped upper and lower portions 14 and 16. Casing 10 is supported on a plurality of legs 11. Extending upwardly from the upper portion 14 is a neck 18 that terminates in a cylindrical flange 20. Extending diametrically through the neck portion 18 is a rod 22 joined to a damper 24. Extending downwardly from the lower conical portion 16 is a lower neck 26 within which is situated a rod 28 connected to a damper 30. The dampers 24 and 30 provide control for the entry and exit of gases passing through the chamber 10.

Within the interior of container 10 above the lower portion 16 is a foraminous or perforate metal layer or screen 32 that is seen in plan view in Fig. 2, and consists of a perforated metal disc supported by brace bars 33. The disc 32 provides support for a mass of carbon adsorbing granules 34. A conduit 36 that is adapted for connection to a source of live steam extends into the lower portion 16 of the casing. Steam is used to liberate solvent adsorbed by the granules 34, and the distillate is condensed and collected in apparatus not shown.

In a practical form, the adsorbing granules are composed of activated carbon formed as rods or pellets. A major portion of the granules are of a size larger than the openings in the foraminous disc 32, but the mass will also contain fines or fragments sufficiently small to pass through such openings, and the pellets are sufficiently frangible that if abraded with the openings in the disc, some of them will disintegrate into small particles or dust. The problem for which this invention provides a solution is with regard to the disposition of the mass of aggregate during movement of container 10 from its point of manufacture or assembly to its site of use. If the aggregate is placed in the container 10 at the point of use, there is likelihood of considerable dust arising therefrom that will damage clean surfaces; whereas, if the aggregate is placed in the container and in direct contact with disc 32 at the point of manufacture or assembly, moving and jostling of the container will cause sifting of the fine particles through the openings in the disc and such action may also cause substantial attrition between the disc and the larger granules to reduce the size of many granules sufficiently to pass through the openings in the disc.

Having reference to Fig. 5, general reference numeral 37 indicates one form of temporary barrier or membrane that is adapted to be disposed on the foraminous layer 32 to protect the carbon particles 34 and prevent sifting of fines. As disclosed, the membrane 37 is composed of 4 segmental portions of a strong fabric, such as muslin or canvas, one of which is shown in Figs. 3 and 4, and indicated at 38. Each of the segmental sections 38 is slightly greater in arcuate dimension than one-fourth of the circumference of the foraminous layer 32 for reasons that will be explained hereinafter. A flexible cord 40 is formed with a slip knot 42 at one end. The opposite end 44 of cord 40 is passed through the slip knot 42 so as to form a noose 46 that envelopes the segment 38. In order to bind the noose 46 with respect to the segment, a layer of adhesive tape 48 may overly one portion of the noose 46 and secure the same to the upper side of the segment 38.

As seen in Fig. 5, four segments designated as A, B, C, D, are arranged in an orderly radial manner within the interior of container 10 on the upper surface of member 32, with a lateral edge of each of the segments overlying a lateral edge of an adjacent segment. Thus, the line 50 indicates a lateral edge of segment A underlying an adjacent edge of segment B, indicated by the line 52. In this manner, the fourth segment D has its lateral edges indicated by reference character 54, 56, overlying portions of segments A and C. The four cords 40 extend upwardly from the apex of each of the segments and are loosely twisted around the rod 22, and for purposes of identification, the separate cords are marked A', B', C', and D', and they must be individually identified when they are assembled in the structure by any suitable means that will serve to identify the individual panels to which each of the several cords are attached.

It will be noted in Figs. 1 and 5 that the outer extremity of each of the panels has been turned upwardly against the inside wall of container 12 forming an annular upstanding portion designated by reference character 58.

After the temporary barrier, composed of the panels A, B, C, and D is mounted within the container in the manner illustrated, and their cords suitably attached in a temporary manner to rod 22, the mass of carbon granules 34 are dumped into the container, and the upper neck 18 is closed by a plate 60 that is bolted or otherwise fastened to the flange 20 and forms a part of the general structure 10.

The container 10, filled in the manner set forth above, together with other pertinent apparatus is shipped from the factory or assembly point to the place of eventual use, and after installation, the plate 60 is removed from the upper flange 20 and each of the cords A', B', C' and D' is detached from the rod 22 and pulled upwardly, commencing with cord D', C', B' and A', whence the loop or noose 46 associated with each of the segmental portions 38 tightens about the segment and brings the segment upwardly through the center of the mass of carbon granules. This may be performed without substantial disturbance of the carbon, and the noose 46 assures against tearing or destruction of the segmental panel. After the several panels have been removed, plate 60 is replaced on the flange 20, and the apparatus is ready for use.

The advantage in this invention is that the carbon granules may be placed in the container 10 at the factory or other point of greatest convenience and will be protected against sifting and attrition with the foraminous screen during the jostling and movement of the apparatus to the point of use, and the eventual user is protected from the mess and inconvenience of having the carbon granules placed in the container at the point of use.

As my invention may be subject to variation, it should be understood that the drawings are merely illustrative of one practical form of the invention, that is subject to modification, and therefore, my invention is limited only to the extent of the appended claims.

I claim:

1. In a fluid treating apparatus, embodying a container formed with a lower surface and a continuous sidewall, a substantially flat perforate plate supported within said container and spaced upwardly from the lower surface to form a false bottom in the container, a mass of fluid treating aggregate carried within said container and supported by said perforate plate, the improvement consisting of a substantially imperforate barrier carried by said perforate plate beneath said aggregate that prevents attrition of the aggregate with the perforate plate and/or sifting of particles of the aggregate through said plate during movement of said container, and means secured to said barrier extending upwardly through the aggregate mass to provide for removal of the barrier through the aggregate without substantially disturbing the aggregate within said container.

2. In a fluid treating apparatus, embodying a container formed with a lower surface and a continuous sidewall, a substantially flat perforate plate supported within said container and spaced upwardly from the lower surface to form a false bottom in the container, a mass of fluid treating aggregate carried within said container and supported by said perforate plate, the improvement consisting of a substantially imperforate flexible barrier carried on the upper surface of said perforate plate and beneath said aggregate that prevents attrition of the aggregate with the perforate plate and/or sifting of particles of the aggregate through said plate during movement of said container, and flexible means secured to said barrier extending upwardly through the aggregate mass to provide for removal of the flexible barrier through the aggregate without substantially disturbing the aggregate within said container.

3. In a fluid treating apparatus, embodying a container formed with a lower surface and a continuous sidewall, a substantially flat perforate plate suported within said container and spaced upwardly from the lower surface to form a false bottom in the container, a mass of fluid treating aggregate carried within said container and supported on said perforate plate, the improvement consisting of a number of sections of substantially dust impervious fabric arranged within the interior of said container overlying said perforate plate and underlying the aggregate mass to form a dust-tight seal beneath the aggregate, and an individual flexible member securely fixed to each section of said fabric, said flexible members collectively extending upwardly through the mass of aggregate and forming means for removing said fabric sections from said perforate plate through the mass of aggregate without substantially disturbing the aggregate within said container.

4. In a fluid treating apparatus comprising a cylindrical container, a circular foraminous layer in said container, a mass of frangible fluid treating aggregate carried within said container and supported on said foraminous layer, the improvement consisting of a multiplicity of segmental shaped sections of substantially dust impervious fabric arranged in radial relationship within the interior of said container with a lateral extremity of one section overlying an extremity of another section to form a substantially dust-tight seal over said foraminous layer and beneath the mass of aggregate, and an individual flexible member securely fixed to each of said segmental portions, said flexible members collectively extending upwardly through the center of the mass of aggregate forming means for removing said sections from said layer through the center of the mass aggregate without substantially disturbing the aggregate within said container.

References Cited in the file of this patent
UNITED STATES PATENTS

| | | |
|---|---|---|
| 1,839,350 | Slagel | Jan. 5, 1932 |
| 2,767,803 | Henry | Oct. 23, 1956 |
| 2,845,138 | Gageby | July 29, 1958 |